March 23, 1954
A. P. SCHNEIDER
2,672,767
AUTOMATIC TRANSMISSION
Filed Oct. 11, 1950
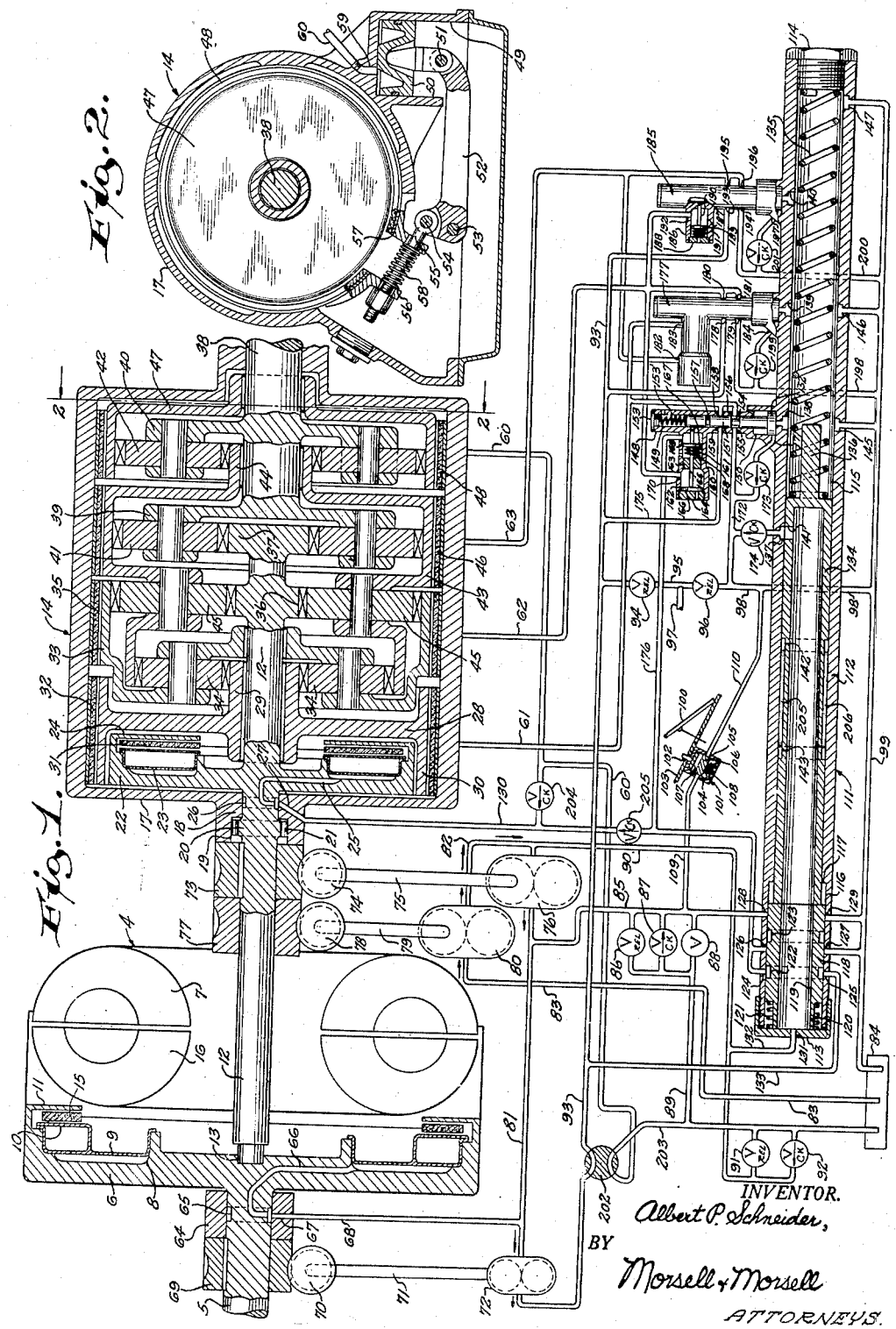
INVENTOR.
Albert P. Schneider,
BY
Morsell & Morsell
ATTORNEYS.

Patented Mar. 23, 1954

2,672,767

UNITED STATES PATENT OFFICE 2,672,767

AUTOMATIC TRANSMISSION

Albert P. Schneider, Milwaukee, Wis.

Application October 11, 1950, Serial No. 189,595

34 Claims. (Cl. 74—645)

This invention relates to improvements in automatic transmissions, and more particularly to transmissions having embodied therein torque transmitting couplings having driving and driven elements between which varying amounts of slippage occurs, during operation. An example of this type of coupling is found in present day automobiles in the form of fluid couplings and hydro-kinetic converters.

Modern automobiles are equipped with various types of automatic fluid transmissions. Some of such transmissions embody means for locking together the driving and driven elements of the fluid coupling when the automobile reaches a certain speed. This is effective to increase the efficiency of the fluid transmission by eliminating entirely all slippage in the coupling when the elements thereof are locked together. Having this locking device responsive entirely to the speed of the automobile is not entirely satisfactory, however, due to the fact that the slippage is eliminated only when the automobile is travelling above a predetermined speed, and whenever the vehicle travels slower than this predetermined speed it is impossible to effect a locking engagement of the fluid coupling elements.

Another aspect of conventional automatic transmissions is that the shifting from one gear to another is accomplished by mechanism responsive entirely to the speed of the vehicle. The aforesaid mechanism shifts the transmission into a predetermined gear ratio for a predetermined range of speeds of the vehicle. For example, any time the vehicle travels at a speed between 12 and 18 miles per hour, the mechanism automatically shifts the transmission into second gear. Obviously, there are many times when, if only from the standpoint of efficiency, it is desirable to have the transmission in high gear while the vehicle is travelling at or below 18 miles per hour. In addition, the down shifts of the conventional transmission are frequently accompanied by an objectionable jerking action.

With the above in mind, it is a general object of the present invention to provide an improved automatic transmission in which the incidence of slippage is greatly reduced and in which excessive slippage is substantially entirely prevented, thereby attaining an efficiency not possible with conventional fluid transmissions.

A further object of the invention is to provide an improved automatic transmission wherein the mechanism for shifting from one gear to another involves no manual operations and is responsive entirely to the amount of slippage in the coupling regardless of the speed of the vehicle.

A further object of the invention is to provide an improved automatic transmission of the type having mechanism for locking together the driving and driven elements of the coupling thereof and having means for actuating said locking mechanism, said means being responsive entirely to the amount of slippage in the coupling, regardless of the speed of the vehicle.

A furthermore specific object of the invention is to provide means for hydraulically actuating the coupling element locking mechanism, said means including a positive displacement pump driven by the driving element of the coupling and a slightly larger positive displacement pump connected in series with the first mentioned pump and driven by the driven element of the coupling, the element locking mechanism communicating with the line connecting said pumps, whereby rotation of the driven element at a predetermined speed relative to the driving element creates a fluid pressure condition in the line connecting said pumps and causes actuation of the element locking mechanism.

A further specific object of the invention is to provide an automatic transmission of the class described having a shifting mechanism including a positive displacement pump driven by the driving element of the coupling and a second positive displacement pump in series with the first mentioned pump and driven by the driven element of the coupling, there being a pressure responsive gear engaging mechanism for each step of the transmission and there being a distribution valve responsive to the pressure in the line connecting said pumps for delivering fluid under pressure to a gear engaging mechanism automatically selected by the distribution valve in response to said pressure condition.

A further object of the invention is to provide an automatic transmission of the class described having embodied therein a one-way clutch for preventing reverse rotation of the driven element of the coupling, said clutch being effective to prevent undesirable backward movement of the vehicle except when the transmission is shifted into reverse.

A further object of the invention is to provide an improved automatic transmission of the class described having means for automatically releasing the coupling element locking mechanism when the speed of the vehicle is just above the idling speed of the engine but which is inoperative to release said elements at higher speeds.

A further object of the invention is to provide an improved automatic transmission of the class described having accelerator operated means for releasing the coupling element locking mechanism to permit shifting into a lower gear whenever more power is needed, such as when passing or when going up a steep hill.

With the above and other objects in view, the invention consists of the improved automatic transmission and all of its parts and combinations, as set forth in the claims, and all equivalents thereof.

In the drawing accompanying and forming a part of this specification, wherein is shown one complete embodiment of the preferred form of the invention, and wherein like characters of reference indicate the same parts in all of the views:

Fig. 1 is a schematic fragmentary sectional plan view of the improved transmission; and Fig. 2 is a transverse vertical sectional view of the planetary gear set and one of its train engaging mechanisms taken approximately along the line 2—2 of Fig. 1.

Referring more particularly to the drawing which illustrates the invention applied to a transmission having embodied therein an hydraulic fluid coupling and a planetary gear set, the numeral 5 indicates a drive shaft which may be connected to a prime mover such as the internal combustion engine of an automobile. Attached to the drive shaft 5 is a housing 6 which is secured to the driving element 7 of a fluid coupling 4. Within the housing 6 is an annular cylinder 8 in which is mounted an annular piston 9 which is axially slidable and non-rotatable relative to the cylinder 8. An annular pressure transmitting member 10 forms a part of the piston 9. An annular flange 11 extends radially inwardly from the periphery of the housing 6 and is spaced from the pressure transmitting member 10. An intermediate shaft 12 is positioned coaxial with the drive shaft 5 and has one end journalled in an axial recess 13 formed on the inner surface of the housing 6. The shaft 12 extends axially through the fluid coupling 4, and exteriorly of the coupling 4 the other end of said shaft forms the driving member of a planetary gear set 14. An annular friction plate 15 is fixed to the shaft 12 within the housing 6 and is positioned in the space between the flange 11 and the member 10. The driven element 16 of the fluid coupling 4 is also fixed to the shaft 12. It is apparent that when the piston 9 is moved to the right, as viewed in Fig. 1, the friction plate 15 is locked between the member 10 and the flange 11, thereby locking the driving element 7 of the coupling 4 to the driven element 16 thereof.

The planetary gear set 14 is preferably of the type having four forward speeds and a reverse. The gear set 14 has a casing 17 provided at its forward (left hand in Fig. 1) end with a bearing boss 18 through which the shaft 12 rotatably extends. The forward end of the bearing boss 18 is provided with an enlarged axial recess 19 which is adapted to accommodate a roller type one-way brake formed by cams 20 formed on the shaft 12 and rollers 21 cooperating therewith. Within the casing 17 the shaft 12 is formed with a housing 22 which is similar to the housing 6. The housing 22 is provided with an annular piston 23 and an annular inwardly extending flange 24 similar to the piston and flange 9 and 11 respectively. A duct 25 communicates between the cylinder of the housing 22 and an annular oil groove 26 formed on the shaft 12 within the bearing boss 18. An oil passage 27 extends through the bearing boss 18 and communicates between the groove 26 and the exterior of said boss.

A clutch and brake wheel 28 is freely rotatably mounted on the shaft 12 rearwardly of the housing 22, said wheel having a hub 29 and a peripheral rim 30. A friction plate 31 is fixed to the hub 29 and is positioned between the piston 23 and the flange 24 of the housing 22. It is apparent that when the piston 23 is moved toward the right, as viewed in Fig. 1, the friction plate 31 is locked between the piston 23 and the flange 24, and the shaft 12 is thereby locked to the wheel 28. The mechanism for hydraulically actuating the piston 23 to accomplish the above-mentioned locking action will be described hereinafter. A brake band 32 encircles the rim 30 of the wheel 28 within the casing 17. The hub 29 is formed with external gear teeth at its right hand end.

A ring gear 33 is freely rotatably mounted on the shaft 12 and rotatably carries a plurality of planet pinions 34 which mesh with the gear teeth formed on the hub 29. A brake band 35 encircles the periphery of the ring gear 33 within the casing 17. At its right hand end the shaft 12 is formed with a pair of spaced sun gears 36 and 37. A driven shaft 38 has one end rotatably extending through a suitable bearing in the rear end wall of the casing 17 coaxial with the shaft 12. Within the casing 17 the driven shaft 38 is formed with a pair of spaced carriers 39 and 40 which respectively carry a plurality of rotatable planet pinions 41 and 42. The planet pinions 41 mesh with the sun gear 37, as shown.

A double ring gear member 43 is provided with a hub 44 which is rotatable on the driven shaft 38, said hub being formed with external gear teeth which mesh with the pinions 42. The double ring gear member 43 meshes with the pinions 41 and 34, as shown, and also serves as a carrier for a plurality of planet pinions 45 which mesh with the ring gear 33 and with the sun gear 36. A brake band 46 encircles a peripheral portion of the double ring gear member 43 within the casing 17 as shown. A ring gear 47 is freely rotatable on the driven shaft 38 and meshes with the planet pinions 42, as shown. The ring gear 47 is also provided with a brake band 48 which encircles the periphery thereof within the casing 17.

In the preferred form of the invention each of the brake bands 32, 35, 46 and 48 is provided with a hydraulic piston band actuating mechanism. Fig. 2 shows one form of brake band actuating mechanism which may be used. In this form the casing 17 is formed with a cylinder 49 in which a piston 50 is reciprocatable. The piston 50 has a pivotal connection, as at 51, to the end of a bell crank lever 52 which is pivoted at 53 and is pivotally connected at 54 to a link 55 which is adjustably connected to the movable end 56 of the brake band 48. The other end 57 of the brake band is fixed to the housing 17, and a coiled compression spring 58, acting between the ends 56 and 57, serves to normally urge them apart to prevent drag on the gear 47. A passage 59 communicates between the closed end of the piston 49 and a conduit 60. Conduits 61, 62 and 63 communicate with the cylinders of the actuating mechanisms (not shown) for the brake bands 32, 35 and 46 respectively.

In the gear set 14 the low forward speed is obtained by holding the ring gear 43 by means of the brake band 46. Power is then transmitted through the planetary gears 41. To obtain the second speed, the brake band 46 is released and the ring gear 33 is held by means of the brake band 35. Power is then transmitted through band 35. For the third speed, ring gear 33 is released and the clutch wheel 28 is held by the brake band 32. Power is then transmitted by the pinions 34, 45 and 41. The fourth, or high speed, which is a direct drive, is obtained by releasing the brake band 32 on the wheel 28 and locking the friction plate 31 between the piston 23 and the flange 24. This locks the entire forward speed portion of the assembly together and causes it to rotate as a unit. To obtain reverse rotation of the driven shaft 38, the ring gear 47 is held against rotation by means of the brake band 48.

The drive shaft 5 is rotatably supported in a bearing 64, and said drive shaft is formed with an annular oil groove 65 within said bearing. An oil passage 66 communicates between the annular cylinder 8 and the oil groove 65, as shown. A passage 67 extends through the bearing 64 and communicates between the oil groove 65 and an external conduit 68. Keyed to the drive shaft 5 is a worm gear 69 which drives a wheel 70 meshed therewith, and said wheel in turn drives a shaft 71 and a positive displacement pump 72.

Keyed to the intermediate shaft 12 is a worm gear 73 which drives a wheel 74 meshed therewith, and the wheel 74 in turn, drives a shaft 75 and a positive displacement pump 76. Freely rotatably mounted on the shaft 12 is a worm 77 which is driven by the housing 6 and drivingly meshes with a wheel 78. The wheel 78 in turn drives a shaft 79 and a positive displacement pump 80.

The pumps 76 and 80 may be of the same size, and the pump 72 is preferably of a predetermined smaller size than the pump 76, for example, the pump 72 may have a capacity of approximately 85% of that of the pump 76 for the same speeds. A conduit 81 communicates between the outlet of the pump 76 and the inlet of the pump 72. The conduit 68 in turn communicates with the conduit 81. A conduit 82 communicates between the outlet of the pump 80 and the inlet of the pump 76, and a conduit 83 communicates between a sump 84 containing hydraulic fluid and the inlet of the pump 80.

A conduit 85 communicates between the conduit 81, a pressure relief valve 86, an inlet check valve 87 and a normally open bleeder valve of predetermined restricted capacity 88. A conduit 89 communicates with the opposite side of the valves 86, 87 and 88 and with the sump 84. A conduit 90 communicates between the conduit 82 and a pressure relief valve 91 and an inlet check valve 92. The other side of the valves 91 and 92 communicate with the conduit 89 leading to the sump 84. A conduit 93 is connected to the outlet of the pump 72. A pressure relief valve 94 communicates with the conduit 93 and is preferably set to bleed the line 93 when the pressure in said line exceeds approximately 80 pounds. A conduit 95 communicates between the outlet of the pressure relief valve 94 and a pressure relief valve 96 which is set to bleed the conduit 95 when the pressure therein exceeds approximately 40 pounds. A branch conduit 97 communicates with the conduit 95 and may supply fluid for any desired auxiliary purposes such as lubrication and the like. The outlet of the valve 96 is connected to a conduit 98 which, in turn, communicates with a conduit 99 leading to the sump 84.

The numeral 100 indicates the accelerator of the vehicle in which the invention is embodied, and the numeral 101 indicates a normally closed valve having an axially movable stem 102 projecting through the floor board 103 in a position to be depressed by the accelerator when the latter is pushed all the way down. The valve 101 may have a cylindrical casing formed with diametrically opposed inlet and outlet passages 104 and 105 respectively. An axially movable cylindrical valve member 106 is positioned in the body of the valve and is formed with a diametrically extending bore 107. A spring 108 urges the valve member upwardly to the position shown, wherein the passage 107 is out of communication with the inlet and outlet ports 104 and 105, and said valve is thereby closed. Upon depression of the stem 102, however, the valve member 106 is moved downwardly against the compression of the spring 108 to bring the passage 107 into registration with the ports 104 and 105, thereby opening the valve. A conduit 109 communicates between the conduit 85 and the inlet port 104 of the valve 101. A conduit 110 communicates between the conduit 98 and the outlet port 105 of the valve 101.

A distribution valve 111 has an elongated tubular cylindrical body 112 which may have one end closed by a threaded cap 113, and its opposite end is closed by a threaded plug 114. The body 112 has an elongated axial bore 115 extending the major portion of the length thereof, and at the end adjacent the cap 113 said body is formed with a bore portion 116 of increased diameter thereby forming a shoulder 117. A sleeve valve 118 is axially slidable in the bore portion 116 and is provided with an axially extending open ended bore 119. A tubular extension 120 is formed on the end of the sleeve 118 adjacent the cap 113, and surrounding the extension 120 there is a helical compression spring 121 having one end in abutment with the cap 113 and the other end in abutment with the sleeve valve 118. The spring 121 normally urges the sleeve valve 118 toward the shoulder 117 which forms a limit seat therefor.

The sleeve valve 118 is formed with a pair of spaced circumferential grooves 122 and 123. The body 112 is formed with a pair of spaced ports 124 and 125 which communicate with the groove 122 when the sleeve valve 118 is in the position of Fig. 1. The body 112 is also formed with a pair of ports 126 and 127 which communicate with the groove 122 when the sleeve valve 118 is in abutment with the shoulder 117, the body 112 also being formed with ports 128 and 129 which communicate with the groove 123 when the sleeve valve 118 is in abutment with the shoulder 117.

A conduit 130 communicates at one end with the passage 27 in the bearing 18 of the planetary gear set 14 and communicates at its other end with the ports 124 and 126. The conduit 85 communicates with the port 128, and the conduit 99 communicates with the ports 127 and 129. The cap 113 of the valve 111 is formed with a central aperture 131, and a conduit 132 communicates between the aperture 131 and the conduit 90. A conduit 133 communicates between the port 125 and the conduit 93.

Axially slidably mounted in the bore 115 of the valve body 112 is a tubular cylindrical shuttle valve member 134 having its end adjacent the sleeve 118 open and having its opposite end closed. A coiled compression spring 135 is positioned in the bore 115 and has one end in engagement with the plug 114 and its other end in engagement with the closed end of the shuttle valve member 134. The valve member 134 may be formed with a projection 136 which is engageable with the plug 114 to limit the movement of said member to the right, as viewed in Fig. 1.

The valve body 112 is formed with preferably four equally spaced ports 137, 138, 139 and 140. The valve body 112 is also formed with ports 145 and 146 which are preferably diametrically opposite the ports 138 and 139 respectively. The shuttle valve member 134 is formed adjacent one end with a port 141 in its side wall, said port registering with the port 137 when the valve member 134 is in the position of Fig. 1. The shuttle valve member 134 is also preferably formed with two circumferential grooves 142 and 143. The port 141 and the grooves 142 and 143 may be spaced apart the same distance as the ports 137, 138, 139 and 140, and said grooves 142 and 143 may be connected by a longitudinal groove 205, which is positioned in longitudinal alignment with the ports 137, 138, 139 and 140, and by a longitudinal groove 206 which is positioned in longitudinal alignment with the ports 145 and 146. The body 112 is also preferably formed with a port 147 adjacent the plug 114. The conduit 99 connects the ports 145, 146 and 147 to the sump 84.

Preferably formed on the valve body 112 adjacent the port 138 is a tubular auxiliary valve body 148 having an axial bore 149 and having a bore portion of enlarged diameter 150 communicating with the port 138. An elongated valve member 151 is positioned in the bore 149 and has formed on one end thereof a piston 152 which is axially slidable in the bore portion 150. The outer end of the valve body 148 may be closed by a screw plug 153, and a compression spring 153' is positioned in the bore 149 between the plug 153 and the adjacent end of the valve member 151. The valve member 151 is formed with a peripheral groove 154, and the body 148 is formed with a pair of spaced ports 155 and 156 which register with the groove 154 when the valve member 151 is in the position of Fig. 1. The valve body 148 is also formed with a pair of spaced ports 157 and 158 which are positioned to register with the groove 154 when the valve member is in its outermost position (not shown). The valve member 151 is also formed with a circumferential groove 159 spaced axially outwardly from the groove 154 and the ports 157 and 158.

Formed on the auxiliary valve body 148 adjacent its outer end is a cylindrical tubular extension 160 which projects at preferably a right angle to the axis of the bore 149 of said body. The extension 160 is formed with a cylindrical bore portion 161 adjacent the valve body 148 and is formed with a cylindrical bore portion 162 of larger diameter, outwardly of the bore portion 161. A screw plug 163 is threaded into the outer end of the bore portion 161, and a screw plug 164 is threaded into the outer end of the bore portion 162. An axially slidable piston rod 165 projects through a suitable axial aperture in the plug 163 and through a coaxial bore in the valve body 148. Fixed to the outer end of the piston rod 165 is a piston 166 which is axially slidable in the bore portion 162, and piston 167 is fixed to said piston rod and is axially slidable in the bore portion 161.

A coiled compression spring 168 is positioned in the bore 161 between the plug 163 and the piston 167, the spring 168 normally urging the piston 167 toward the right (see Fig. 1) to urge the rod 165 into engagement with the valve member 151. The peripheral groove 159 of the valve member 151 is positioned so that when said valve member is in its outermost position (not shown) the end of the piston rod 165 will snap into said groove, under the urging of the spring 168, and will lock the valve member 151 in this position. The extension 160 is formed with a port 169 communicating with the bore portion 161 at the inner side of the piston 167, and said extension is also formed with a port 170 communicating with the bore portion 162 adjacent the plug 163 at the inner side of the piston 166. The valve body 148 is also preferably formed with a passage 171 communicating with the enlarged bore 150 at its inner end, said passage being closed off by the piston 152 when said piston is in the position of Fig. 1.

A conduit 172 communicates between the port 155 and the conduit 98, and a check valve 173 is connected between the conduit 172 and the passage 171. A check valve 174 is connected between the conduit 172 and the port 157, and a conduit 175 communicates between the port 157 and the conduit 93. A conduit 176 communicates between the port 169 in the tubular extension 160 and the conduit 130.

A valve body 177 which is preferably identical with the valve body 148 and which in all respects contains identical mechanism, is preferably formed on the valve body 112 adjacent the port 139 as shown. The valve body 177 is formed with ports 178, 179, 180 and 181 corresponding to ports 157, 155, 158 and 156 respectively. The tubular extension of the valve body 177 is formed with ports 182 and 183 which correspond with the ports 170 and 169 respectively. A passage 184 of the valve body 177 corresponds with the passage 171 of the valve body 148.

A third valve 185 is formed on the valve body 112 adjacent the port 140. The valve body 185 is similar in all respects and contains mechanism identical to the valve bodies 177 and 148, with the exception of the tubular extension 186 and the mechanism contained therein. The tubular extension 186 is provided with a cylindrical bore 187, the outer end of which is closed by a screw plug 188. A piston 189 is axially slidable in the bore 187 and is provided with a piston rod 190 which slidably extends through an aperture in the side wall of the body 185, in the same manner that the piston rod 165 extends through the side wall of the body 148. A coiled compression spring 191 is positioned in the bore 187 between the piston 189 and the plug 188 and urges the piston rod into the main bore of the body 185.

A port 192 communicates with the bore 187 at the inner end of the piston 189. The valve body 185 is formed with ports 193, 194, 195 and 196 which are identical with the ports 157, 155, 158 and 156 of the valve body 148. A passage 197 in the valve body 185 is identical with the passage 171 in the valve body 148. A conduit 198 communicates between the port 179 and the conduit 99, and a check valve 199 is connected between the passage 184 and the conduit 198.

The conduit 62, extending from the gear set 14, communicates with the port 170 of the tubular extension 160, the ports 180 and 181 of the valve body 177, and the port 192 of the tubular extension 186 on the valve body 185. The conduit 93 communicates with the port 178 of the valve body 177 and with the port 193 of the valve body 185. The conduit 61 from the gear set 14 communicates with the ports 156 and 158 of the valve body 148, and with the port 183 of the tubular extension of the valve body 177. The conduit 63 from the gear set 14 communicates with the port 182 of the tubular extension of the valve 177 and with the ports 195 and 196 of the valve body 185. A conduit 200 connects the port 194 of the valve body 185 with the conduit 99, and a check valve 201 is connected between the passage 197 and the conduit 200, as shown. The conduit 60 from the gear set 14 is connected to a four-way valve 202 which is, in turn, connected into the line 93 as shown. Conduit 203 connects the valve 202 with conduit 89. A check valve 204 communicates between the conduit 60 and the conduit 130, and a check valve 205 is connected into the conduit 130 between the line 176 and the valve 204, as shown. During normal driving in a forward direction the valve 202 is positioned as shown to provide communication between the conduits 60 and 203. The check valves 173, 174, 197, 199 and 201 are preferably of restricted capacity.

Operation

The operation of the improved automatic transmission will now be described. Assuming that the vehicle is at a standstill and the engine is idling, turning over the driving element 7 of the coupling 4 without imparting any substantial rotation to the driven element 16 of said coupling, the pumps 72 and 80, being driven by the driving element, are pumping oil. Since the driven element 16 and the shaft 12 are not rotating, the oil pumped by the pump 80 into the conduit 82 flows into the conduit 90, the conduit 132, through the sleeve 118 and the shuttle valve member 134, out the ports 141 and 137 and through the valve 174 to the sump 84 via the conduits 172, 98 and 99. The check valve 174 relieves the pressure created by the pump 80, but being of restricted size, will relieve only such pressures as are created as a result of a predetermined differential between the speeds of the pumps 80 and 76, which differential is directly proportional to the amount of slippage between the driving and driven elements of the coupling 4.

Oil is drawn from the sump 84 into the pump 72 through the conduits 81, 85, the check valve 87 and the conduit 89. Since the pump 76 is not operating, operation of the pump 72 creates a pressure in the line 93, and said pressure is transmitted through the conduit 133, the port 125, the groove 122, the port 124, the conduit 130, and the passages 27 and 25 to actuate the piston 23 and to thereby lock the gear set 14 into high gear. The pressure relief valve 94 permits the oil pumped by the pump 72 to flow therethrough from the conduit 93 whenever the pressure in the conduit 93 exceeds approximately 80 pounds. The fluid flows from the valve 94 through the pressure relief valve 96 which permits said fluid to flow therethrough whenever the pressure thereof exceeds 40 pounds. The fluid flowing through the valve 96 returns to the sump 84 through the conduits 98 and 99. The conduit 97 provides a supply of fluid at approximately 40 pounds pressure for any desired auxiliary purpose. However, it may be omitted if desired, together with the valve 96.

The pressure in the conduit 130 is also transmitted through the conduit 176 and the port 169 to the right hand side of the piston 167 in the tubular extension 160 of the valve body 148. This pressure holds the piston 167 and the rod 165 in the position shown in Fig. 1, in which position the spring 168 is compressed and the rod is out of engagement with the valve member 151.

When the driver depresses the accelerator 100 to initiate motion of the automobile, a great amount of slippage occurs in the coupling 4, and the driving element 7 turns rapidly relative to the driven element 16, due to the inability of the coupling to transmit enough power to overcome the inertia of the automobile and move it from a standstill in high gear. As a result of the spinning of the element 7 relative to the element 16, the pump 80 pumps a relatively large quantity of fluid into the conduit 82, while the pump 76 fails to withdraw any therefrom, and a high pressure is built up in the conduits 82, 90 and 132, said pressure being greater than the valve 174 can relieve. As a result, the shuttle valve member 134 is moved toward the right against the compression of the spring 135.

As the valve member 134 moves toward the right, the sleeve valve 118 (which had been held in the position of Fig. 1 by the spring 135 and the shuttle valve 134) is moved to the right against the shoulder 117 by the spring 121. This aligns the groove 122 with the ports 126 and 127 and aligns the groove 123 with the ports 128 and 129. As a result, the pressure in the conduits 130 and 176 is relieved through the ports 126 and 127 and the groove 122, and the conduit 81 is brought into direct communication with the sump 84 through the conduit 85, the port 128, the groove 123, the port 129 and the conduit 99. Because of this direct communication with the sump it is impossible for pressure to be built up in the conduit 81 sufficient to cause actuation of the piston 8 in the housing 22.

As the port 141 comes into registration with the port 138 of the valve body 112, fluid under pressure from the conduit 82 flows from the shuttle valve ports 141 and 138 and lifts the piston 152. As the piston 152 is lifted, the inner end of the piston rod 165 snaps into the groove 159 and holds the valve 151 in its raised or outermost position. The peripheral groove 154 of the valve member 151 registers with the ports 157 and 158 of the valve body 148 when the member 151 is in its raised position. Fluid under pressure then flows from the conduit 93 through the conduit 175, the port 157, the groove 154, the port 158 and the conduit 61 to the actuating mechanism of the brake band 32. Since the piston 23 released the friction plate 31 when the pressure in the line 130 was relieved, the driven shaft 12 is no longer locked to the clutch wheel 26 and continues to rotate while the clutch wheel is held stationary by the brake band 32. The transmission is now in third gear. If the slippage between the driving and the driven elements of the coupling 4 is so great that the pressure in the conduit 82 resulting therefrom exceeds the amount which can be counterbalanced by the spring 135, then the shuttle valve member 134 will move to the right to bring the port 141 into registration with the port 139.

The fluid pressure within the shuttle valve 134 raises the piston in the valve body 177 in the same manner that the piston 152 was raised during the previous step. Pressure from the conduit 93 now flows through the ports 178 and 180 and through the conduit 62 to the actuating mechanism for the brake band 35. Simultaneously, pressure from the line 62 also enters the cylinder bores 182 and 187 to hold the piston rods 165 and 190 retracted, as shown in Fig. 1. Retraction of the piston rod 165 releases the valve member 151 and permits said member to move downwardly under the urging of the spring 153' thereabove. The fluid from the cylinder 150 below the piston 152 bleeds back to the sump through the port 138, the groove 142 (which is in registration therewith), and the conduit 99. As the valve member 151 moves downwardly, pressure in the conduit 61 and to the port 183 of the valve body 177 is relieved, thereby releasing the brake band 32 and permitting the piston rod within the valve body 177 to lock the valve therein in raised position. The gear set 14 is now in second gear.

If the slippage between the driving and driven elements of the coupling 4 is still so great that the pressure from the conduit 82 is greater than that which can be counterbalanced by the spring 135, the shuttle valve member 134 moves still farther to the right until the projection 136 thereon abuts the screw plug 114. In this position the port 141 registers with the port 140. Fluid under pressure flowing through the ports 140 and 141 lifts the valve member and the piston in the valve body 185 and causes fluid under pressure to flow from the conduit 93 through the ports 193 and 195 into the conduit 63. Fluid pressure in the conduit 63 enters the port 182 of the valve body 177 and retracts the piston and piston rod therein from locking position, thereby permitting the valve member within the valve body 177 to return to the position of the valve member 151 shown in Fig. 1. As this occurs, pressure from the line 93 is cut off from the conduit 62, as is the pressure to the ports 170 and 192. The brake band 35 is thereby released, and the pressure in the conduit 63 actuates the brake band 46, to hold the ring gear 43 stationary. As the pressure at the port 192 is relieved, the piston rod 190 snaps to the right to lock the valve member in the body 185 in raised position. The gear set 14 is now in low gear.

In low gear the gear set 14 transmits the greatest amount of power to the driven shaft 38, and the automobile, if it has not already done so, begins to move forward. The slippage between the driving and driven elements of the coupling 4 decreases as the automobile picks up speed, and accordingly the speed of the pump 76 begins to approach the speed of the pump 80. This decreases the pressure in the conduit 82 and in the shuttle valve 134, and the pressure of the spring 135 eventually overcomes this pressure to move the shuttle valve member 134 to the left sufficient to bring the port 141 into registration with the port 139. This raises the valve member in the valve 177 and lowers the valve member in the valve 185 to thereby cause release of the brake band 46 and engagement of the brake band 35 thus shifting the gear set 14 into second gear. Any slight increase in the slippage in the coupling 4 resulting in a corresponding increase in pressure in the conduit 82 is relieved by the check valve 199.

As the car accelerates in second gear the speed of the driven element of the coupling continues to approach the speed of the driving element 7, and accordingly the speed of the pump 76 continues to approach the speed of the pump 80. This further lowers the pressure in the conduit 82, and when the pressure within the shuttle valve 134 is overcome by the pressure of the spring 135, said spring moves the shuttle valve 134 to the left to bring the port 141' into registration with the port 138. This raises the valve member 151 and lowers the valve member in the valve 177 to thereby cause engagement of the brake band 32 and release of the brake band 35. The gear set 14 is now in third gear, and any slight increase in the pressure in the conduit 82, resulting from increased slippage due to the upshift, is relieved by the check valve 173.

The automobile continues to accelerate in third gear, and the pump 76 accordingly continues to approach the speed of the pump 80. The pressure in the conduit 82 and in the shuttle valve member 134 continues to decrease, and when this pressure is overcome by the spring 135, the shuttle valve member is moved to the left to the position of Fig. 1 thereby releasing the brake band 32 and causing the piston 23 to lock the friction plate 31 to the flange 24, to shift the gear set 14 in high gear.

Simultaneously, the communication between the conduit 85 and the conduit 99 through the groove 123 of the sleeve 118 is shut off. Any slight increase in slippage between the driving and driven elements of the coupling 4 resulting from the upshift to high gear, and causing a corresponding increase in pressure in the conduit 82 is relieved by the check valve 174.

As the car accelerates in high gear the speed of the driven member 16 gradually approaches the speed of the driving member 7 until the slippage therebetween is at a minimum and the efficiency of the coupling is at a maximum. As an example, this point may be reached in certain couplings when the speed of the driven member 16 is approximately 85% of the speed of the driving member 7 regardless of what the actual speed of the elements is. The size of the pump 72 is such that when the efficiency of the coupling 4 very closely approaches its maximum, the amount of oil pumped into the conduit 81 by the pump 76 is greater than the amount of oil drawn from said conduit by the pump 72. This causes a building up of pressure in said conduit, and this pressure is transmitted through the conduit 68 and the passages 67 and 66 to the piston 9 which in turn locks the friction plate 15 to the flange 11. When the coupling 4 is so engaged, the driving element 7 is fixedly connected to the driven element, thereby eliminating all slippage and providing a direct drive between the shafts 5 and 12. The elements of the coupling 4 are automatically locked up in the manner described at any speed at which the coupling approaches a predetermined state of near minimum slippage. The improved lock-up mechanism makes it possible for the automobile to be pushed for starting purposes, since the coupling 4 is automatically locked up when the driven element 16 tends to drive the driving element 7, this being true because in such a case the speed of the pump 76 would exceed that of the pump 72, and would therefore create the pressure in the conduit 81 necessary for the locking-up operation.

Once the coupling 4 is locked up, it normally remains locked up until the speed of the automobile decelerates to slightly above idling speed. At this speed the normally open bleeder valve 88 of predetermined limited capacity bleeds off to the sump 84 the excess fluid pumped into the line 81 by the pump 76, thereby relieving the piston 9 and unlocking the coupling 4.

There are times, however, when it is desired to have increased power over and above that available in high gear. An example of this is the power needed to pass another car or the additional power needed to accelerate on a hill. At such times, in order to shift to a lower gear and to thereby get increased power, it is only necessary to depress the accelerator 100 to the floor, thereby depressing the valve stem 102 of the valve 101 and moving the valve 106 downwardly against the compression of the spring 108 to bring the passage 107 of the valve into communication with the ports 104 and 105. Opening of the valve 101 in this manner permits the excess fluid in the conduit 81 to bleed through the conduit 85, the conduit 109, the valve 101, the conduits 110, 98 and 99 back to the sump 84. Bleeding of the excess fluid from the conduit 81, of course, causes the pressure in said line to drop, thereby releasing the friction plate 15 from locking engagement by the annular piston 9 and disengaging the driving element of the coupling 4 from the driven element thereof.

Acceleration of the engine due to depression of the accelerator 100 increases the slippage between the released elements of the coupling, and, in the manner previously described, the transmission gear set 14 is automatically shifted to a lower gear in accordance with the amount of slippage in the coupling. The accelerator need be depressed all the way down only long enough to cause disengagement of the coupling elements. It may then be raised out of depressing contact with the valve 101 to again close said valve. When the increased power is no longer needed or the desired speed is attained, and the accelerator 100 is raised to normal driving position, the efficiency of the coupling again increases to approach its maximum. When the predetermined condition of near minimum slippage is attained, the coupling automatically becomes locked up as before.

To accomplish movement of the automobile in reverse, it is only necessary to turn the valve 202 90° in a clockwise direction so that it provides communication between the outlet of the pump 72 and the conduit 60. In this position pressure from the pump 72 causes actuation of the pistons 50 and 23, thereby causing the band 48 to hold the ring gear 47 stationary and locking the housing 22 to the clutch wheel 28. Simultaneously, all pressure in the portion of the conduit 93 to the right of the valve 202 is bled back to the sump 84 through the conduit 203.

It is apparent that the improved transmission automatically shifts the gear set 14 into the particular step which will result in a maximum efficiency (minimum slip) of the coupling. For example, if the automobile is starting on a slight down grade wherein the power necessary to move the automobile from standstill is less than that which would be necessary if the automobile was on a level grade, the transmission may shift the gear set 14 into second or third gear rather than into low gear if the car can be moved in either second or third gear without excessive slippage in the coupling. This differs from conventional automatic transmissions wherein the gear shifting depends entirely upon the speed of the vehicle and not upon the slippage in the coupling. Regardless of what step the gear set 14 may be in, the transmission will automatically adjust itself to changing load conditions by shifting into other steps, whether higher or lower, to maintain maximum efficiency (minimum coupling slippage). This is possible due to the fact that the changing load conditions are instantly reflected in corresponding changes in the amount of slippage in the coupling and because the shifting of the gear set 14 into a particular step is accomplished automatically in response to a particular range of slippage in the coupling. The improved transmission is designed so that the shuttle valve 134 always seeks the highest gear ratio which the coupling can pull without excessive slippage.

The improved lock-up feature of the invention greatly increases the efficiency of the present transmission over those having lock-up mechanisms responsive entirely to speed. In addition, the lock-up mechanism of the invention permits an automobile to travel at low speeds with the coupling thereof locked up. This permits safe driving both on slippery roads and when traveling down hill, by permitting the coupling to be locked up at such times.

The automatic shifting feature of the improved transmission which maintains the coupling in a condition of least possible slippage regardless of the speed of the vehicle and the load, is an improvement over conventional automatic transmissions which shift in accordance with the speed of the vehicle, because in the latter the motor frequently overdrives and causes excessive slippage. This slippage is very wasteful and causes heating up of the coupling as well as excessive gasoline consumption. A further advantageous feature of the improved automatic transmission is the fact that no manual control whatever is required to shift the gear set 14 from one forward step to another regardless of the step into which the gear set is to be shifted for maximum efficiency.

As previously pointed out, the gear set 14 in the improved transmission is engaged in high gear whenever the engine driving said transmission is idling. This is different from certain conventional automatic transmissions which have their gear sets engaged in a lower gear at such times. The latter type of transmission tends to cause the vehicle to creep when the vehicle is at a standstill with its engine idling, such as when the vehicle is stopped for a stop sign or the like. To overcome the creeping it is necessary to apply the brake. The improved transmission avoids all tendency to cause creeping when idling at a standstill by having the gear set engaged in high gear at such times and thereby taking advantage of the fact that the fluid coupling in the improved transmission doesn't transmit enough torque at idling speed to move the vehicle from a standstill when the gear set is engaged in high gear.

As an additional feature of the improved transmission, the one-way brake provided by the cams 20 and the bearings 21 is effective as a hill holder to prevent back sliding of the vehicle when stopped on an up-hill grade. The parts 20 and 21 provide a one-way brake which prevents reverse rotation of the shaft 12, the housing of the planetary gear set 14 being non-rotatable. Since the shaft 12 is prevented from rotating in a reverse direction, shaft 39 is prevented from rotating in a reverse direction at any time the gear set 14 has a forward speed train engaged. This provides an automatic hill holding means which prevents the car from travelling backwardly at any time a forward gear train is engaged. This eliminates the necessity of using the brake or the engine to hold the vehicle at such times.

While the invention has been shown and described as applied to an automatic transmission having embodied therein a fluid coupling, any suitable power transmitting mechanism having a slip characteristic may be used, such as a hydrokinetic torque converter, an electric slip coupling, an electrostatic coupling, or a mechanical inertia type power transmitting mechanism, all of which are well known in the power transmitting art. An example of an electrostatic coupling is one wherein particles of dielectric material are suspended in an insulating fluid contained between closely spaced rotatable metallic plates which form the driving and driven elements of the coupling. High voltage applied to the plates causes an increase in viscosity of the fluid and transmission of torque from one rotating plate to the other. A mechanical inertia type transmission is a device by means of which the torque ratio can be continuously varied by mechanical means, usually by means of roller ratchets or equivalent devices. In certain types power is transmitted by imparting an oscillating motion to one race or ring of a roller ratchet, and the torque ratio is controlled by varying the amplitude of the oscillations.

Various other changes and modifications may be made without departing from the spirit of the invention, and all of such changes are contemplated as may come within the scope of the claims.

What is claimed as the invention is:

1. In combination: a power transmitting mechanism having a rotary driving element adapted to be driven by a source of power, a rotary driven element, and fluid pressure actuated mechanism for directly connecting said driving element to said driven element; a pump driven by said driven element; a pump of predetermined smaller size driven by said driving element; means for supplying fluid to the inlet of one of said pumps; conduit means connecting the outlet of said fluid-supplied pump to the inlet of the other of said pumps and to said fluid pressure actuated means, whereby rotation of the driven element at a predetermined speed relative to the driving element causes a predetermined fluid pressure condition in said conduit mans in response to which the element connecting mechanism directly connects said driving and driven elements.

2. In combination: a power transmitting mechanism having a rotary driving element adapted to be driven by a source of power, a rotary driven element, and fluid pressure actuated mechanism for directly connecting said driving element to said driven element; a positive displacement pump driven by said driven element; a positive displacement pump of predetermined smaller size driven by said driving element; means for supplying fluid to the inlet of one of said pumps; conduit means connecting the outlet of said fluid-supplied pump to the inlet of the other of said pumps and to said fluid pressure actuated means, whereby rotation of the driven element at a predetermined speed relative to the driving element causes a predetermined fluid pressure condition in said conduit means in response to which the element connecting mechanism directly connects said driving and driven elements.

3. In combination: a power transmitting mechanism having a rotary driving element adapted to be driven by a source of power, a rotary driven element, and fluid pressure actuated mechanism for directly connecting said driving element to said driven element; a positive displacement pump driven by said driven element; a positive displacement pump of a predetermined smaller size driven by said driving element; means for supplying hydraulic fluid to the inlet of one of said pumps; conduit means connecting the outlet of said fluid-supplied pump to the inlet of the other of said pumps and to said fluid pressure actuated means, whereby rotation of the driven element at a predetermined speed relative to the driving element causes a predetermined fluid pressure condition in said conduit means in response to which the element connecting mechanism directly connects said driving and driven elements.

4. In combination: a power transmitting mechanism having a rotary driving element adapted to be driven by a source of power, a rotary driven element, and hydraulically actuated mechanism for directly connecting said driving element to said driven element; a positive displacement pump driven by said driven element; a positive displacement pump of smaller size driven by said driving element; means for supplying hydraulic fluid to the inlet of said driven element pump; and conduit means connecting the outlet of said driven element pump to the inlet of said driving element pump and to said hydraulically actuated means, whereby rotation of the driven element at a predetermined speed relative to the driving element causes a predetermined hydraulic pressure in said conduit means in response to which the element connecting mechanism directly connects said driving and driven elements.

5. In combination: a power transmitting mechanism having a rotary driving element adapted to be driven by a source of power, a rotary driven element, and hydraulically actuated mechanism for directly connecting said driving element to said driven element; a positive displacement pump driven by said driven element; a positive displacement pump of predetermined smaller size driven by said driving element; means for supplying hydraulic fluid to the inlet of said driven element pump; conduit means connecting the outlet of said driven element pump to the inlet of said driving element pump and to said hydraulically actuated means, whereby rotation of the driven element at a predetermined speed relative to the driving element causes a predetermined hydraulic pressure in said conduit means in response to which the element connecting mechanism directly connects said driving and driven elements; and a normally open bleeder valve of restricted capacity in said conduit means.

6. In combination: a power transmitting mechanism having a rotary driving element adapted to be driven by a source of power, a rotary driven element, and hydraulically actuated mechanism for directly connecting said driving element to said driven element; a positive displacement pump driven by said driven element; a positive displacement pump of predetermined smaller size driven by said driving element; a source of hydraulic fluid; means for supplying hydraulic fluid from said source to the inlet of said driven element pump; conduit means connecting the outlet of said driven element pump to the inlet of said driving element pump and to said hydraulically actuated means, whereby rotation of the driven element at a predetermined speed relative to the driving element causes a predetermined hydraulic pressure in said conduit means in response to which the element connecting mechanism directly connects said driving and driven elements; an inlet check valve communicating between said conduit means and said source of hydraulic fluid; and a normally open bleeder valve of restricted capacity in said conduit means.

7. In combination: a power transmitting mechanism having a rotary driving element adapted to be driven by a source of power and a rotary driven element; a variable speed transmission driven by said driven element; a driven shaft driven by said transmission; fluid pressure actuated shifting mechanism connected to said transmission for varying the speed of said driven shaft relative to that of said driven element; a pump driven by said driving element; a pump driven by said driven element; means for supplying fluid to the inlet of one of said pumps; and conduit means connecting the outlet of said fluid-supplied pump to the inlet of the other of said pumps and to said fluid pressure actuated shifting mechanism, whereby rotation of the driving element at a predetermined speed relative to the driven element causes a fluid pressure condition in said conduit means.

8. In combination: a power transmitting mechanism having a rotary driving element adapted to be driven by a source of power, a rotary driven element, and fluid pressure actuated mechanism for directly connecting said driving element to said driven element; a variable speed transmission driven by said driven element; a driven shaft driven by said transmission; fluid pressure actuated shifting mechanism connected to said transmission for varying the speed of said driven shaft relative to that of the driving element; a first positive displacement pump driven by said driving element; a second positive displacement pump driven by said driven element; means for supplying fluid to the inlet of said first pump; first conduit means connecting the outlet of the first pump to the inlet of the second pump and to said fluid pressure actuated shifting mechanism; a third positive displacement pump driven by said driving element; and second conduit means connecting the outlet of said second pump to the inlet of said third pump and to said fluid pressure actuated element connecting mechanism.

9. In combination: a power transmitting mechanism having a rotary driving element adapted to be driven by a source of power, a rotary driven element, and fluid pressure actuated mechanism for directly connecting said driving element to said driven element; a variable speed transmission driven by said driven element; a driven shaft driven by said transmission; fluid pressure actuated shifting mechanism connected to said transmission for varying the speed of said driven shaft relative to that of the driving element; a first positive displacement pump driven by said driving element; a second positive displacement pump driven by said driven element; means for supplying fluid to the inlet of said first pump; first conduit means connecting the outlet of the first pump to the inlet of the second pump and to said fluid pressure actuated shifting mechanism; a third positive displacement pump driven by said driving element; second conduit means connecting the outlet of said second pump to the inlet of said third pump and to said fluid pressure actuated element connecting means; and a normally closed bleeder valve in said second conduit means, said valve also being connected to said first conduit means and being responsive to a predetermined pressure therein to open and bleed said second conduit means and prevent the building up of substantial pressures therein, thereby rendering the element connecting mechanism inoperative.

10. In combination: a power transmitting mechanism having a rotary driving element adapted to be driven by a source of power, a rotary driven element, and fluid pressure actuated mechanism for directly connecting said driving element to said driven element; a variable speed transmission driven by said driven element; a driven shaft driven by said transmission; fluid pressure actuated shifting mechanism connected to said transmission for varying the speed of said driven shaft relative to that of the driving element; a first positive displacement pump driven by said driving element; a second positive displacement pump driven by said driven element; means for supplying fluid to the inlet of said first pump; first conduit means connecting the outlet of the first pump to the inlet of the second pump and to said fluid pressure actuated shifting mechanism; a third positive displacement pump driven by said driving element; second conduit means connecting the outlet of said second pump to the inlet of said third pump and to said fluid pressure actuated element connecting means; a normally released accelator; and a normally closed accelerator operated bleeder valve in said second conduit means, said valve being responsive to depression of the accelerator a predetermined amount to bleed said second conduit means and reduce the pressure therein and to thereby release the element connecting mechanism.

11. In combination: a power transmitting mechanism having a rotary driving element adapted to be driven by a source of power, a rotary driven element, and fluid pressure actuated mechanism for directly connecting said driving element to said driven element; a variable speed transmission driven by said driven element; a driven shaft driven by said transmission; fluid pressure actuated shifting mechanism connected to said transmission for varying the speed of said driven shaft relative to that of the driving element; a first positive displacement pump driven by said driving element; a second positive displacement pump driven by said driven element; means for supplying fluid to the inlet of said first pump; first conduit means connecting the outlet of the first pump to the inlet of the second pump and to said fluid pressure actuated shifting mechanism; bleeder valve means of restricted capacity normally communicating with said first conduit means; a third positive displacement pump driven by said driving element; and second conduit means connecting the outlet of said second pump to the inlet of said third pump and to said fluid pressure actuated element connecting means.

12. In combination: a power transmitting mechanism having a rotary driving element adapted to be driven by a source of power, a rotary driven element, and fluid pressure actuated mechanism for directly connecting said driving element to said driven element; a variable speed transmission driven by said driven element; a driven shaft driven by said transmission; fluid pressure actuated shifting mechanism connected to said transmission for varying the speed of said driven shaft relative to that of the driving element; a first positive displacement pump driven by said driving element; a second positive displacement pump driven by said driven element; means for supplying fluid to the inlet of said first pump; first conduit means connecting the outlet of the first pump to the inlet of the second pump and to said fluid pressure actuated shifting mechanism; bleeder valve means normally communicating with said first conduit means; an inlet check valve communicating between said first conduit means and a source of hydraulic fluid; a pressure relief valve in said first conduit means; a third pump driven by said driving element; a second conduit means connecting the outlet of said second pump to the inlet of said third pump and to said fluid pressure actuated element connecting means; a pressure relief valve in said second conduit means; and an inlet check valve communicating between said second conduit means and a source of hydraulic fluid.

13. In combination: a power transmitting mechanism having a rotary driving element and a rotary driven element; a positive displacement pump driven by said driving element; a positive displacement pump driven by said driven element; means for supplying fluid to the inlet of said driving element pump; conduit means connecting the outlet of the driving element pump to the inlet of the driven element pump; a planetary transmission driven by said driven element and having a plurality of planetary trains; an hydraulically actuated engaging mechanism for each of said trains, each of said mechanisms having a conduit leading thereto; a source of fluid under pressure; and a distribution valve connected to said source of fluid under pressure and to said train engaging mechanism conduits, said valve also being connected to said conduit means and being responsive to a predetermined pressure in said conduit means to deliver fluid under pressure from said source to a predetermined train engaging mechanism.

14. In combination: a power transmitting mechanism having a rotary driving element adapted to be driven by a source of power, a rotary driven element, and fluid pressure actuated mechanism for directly connecting said driving element to said driven element; a pump driven by said driven element; a pump driven by said driving element; means for supplying fluid to the inlet of one of said pumps; conduit means connecting the outlet of said fluid-supplied pump to the inlet of the other of said pumps and to said fluid pressure actuated means, whereby rotation of the driven element at a predetermined speed relative to the driving element causes a predetermined fluid pressure condition in said conduit means in response to which the element connecting mechanism directly connects said driving and driven elements; a normally released accelerator; and a normally closed accelerator operated bleeder valve in said conduit means, said valve being responsive to a predetermined movement of the accelerator to vent said conduit means and relieve the pressure condition therein to thereby release the element connecting mechanism.

15. In combination; a power transmitting mechanism having a rotary driving element adapted to be driven by a source of power, a rotary driven element, and fluid pressure actuated mechanism for directly connecting said driving element to said driven element; a positive displacement pump driven by said driven element; a positive displacement pump driven by said driving element; means for supplying hydraulic fluid to the inlet of one of said pumps; conduit means connecting the outlet of said last mentioned pump to the inlet of the other of said pumps and to said fluid pressure actuated means, whereby rotation of the driven element at a predetermined speed relative to the driving element causes a predetermined fluid pressure condition in said conduit means in response to which the element connecting mechanism directly connects said driving and driven elements; a normally released accelerator; and a normally closed accelerator operated bleeder valve in said conduit means, said valve being responsive to a predetermined movement of the accelerator to vent said conduit means and relieve the pressure condition therein to thereby release the element connecting mechanism.

16. In combination: a power transmitting mechanism having a rotary driving element adapted to be driven by a source of power, a rotary driven element, and hydraulically actuated mechanism for directly connecting said driving element to said driven element; a positive displacement pump driven by said driven element; a positive displacement pump of predetermined smaller size driven by said driving element; a source of hydraulic fluid; means for supplying hydraulic fluid from said source to the inlet of said driven element pump; conduit means connecting the outlet of said driven element pump to the inlet of said driving element pump and to said hydraulically actuated means, whereby rotation of the driven element at a predetermined speed relative to the driving element causes a predetermined hydraulic pressure in said conduit means in response to which the element connecting mechanism directly connects said driving and driven elements; a pressure relief valve communicating with said conduit means; and an inlet check valve communicating between said conduit means and said source of hydraulic fluid.

17. In combination: a power transmitting mechanism having a rotary driving element adapted to be driven by a source of power, a rotary driven element, and hydraulically actuated mechanism for directly connecting said driving element to said driven element; a positive displacement pump driven by said driven element; a positive displacement pump of predetermined small size driven by said driving element; a source of hydraulic fluid; means for supplying hydraulic fluid from said source to the inlet of said driven element pump; conduit means connecting the outlet of said driven element pump to the inlet of said driving element pump and to said hydraulically actuated means, whereby rotation of the driven element at a predetermined speed relative to the driving element causes a predetermined hydraulic pressure in said conduit means in response to which the element connecting mechanism directly connects said driving and driven elements; a pressure relief valve in said conduit means; an inlet check valve communicating between said conduit means and said source of hydraulic fluid; and a normally open bleeder valve of restricted capacity in said conduit means.

18. In combination: a power transmitting mechanism having a rotary driving element adapted to be driven by a source of power, a rotary driven element, and hydraulically actuated mechanism for directly connecting said driving element to said driven element; a positive displacement pump driven by said driven element; a positive displacement pump of predetermined smaller size driven by said driving element; a source of hydraulic fluid; means for supplying hydraulic fluid from said source to the inlet of said driven element pump; conduit means connecting the outlet of said driven element pump to the inlet of said driving element pump and to said hydraulically actuated means, whereby rotation of the driven element at a predetermined speed relative to the driving element causes a predetermined hydraulic pressure in said conduit means in response to which the element connecting mechanism directly connects said driving and driven elements; a pressure relief valve in said conduit means; and an inlet check valve communicating between said conduit means and said source of hydraulic fluid.

19. In combination: a transmission having a driving shaft and a driven shaft, said transmission being shiftable to provide a plurality of speed ratios between said driving and driven shafts; a separate fluid pressure actuated transmission shifting mechanism for each of said speed ratios; a source of fluid under pressure; a variable pressure conduit means; a distribution valve connected to said conduit means, said valve having a separate auxiliary valve connected to each of said shifting mechanisms and to said source of fluid under pressure, said auxiliary valves being normally closed and each of the latter being actuatable to open position wherein they deliver fluid under pressure from said source to the shifting mechanism connected to said auxiliary valve, said distribution valve also having a movable member for successively actuating said auxiliary valves in response to predetermined pressures in said conduit means; and releasable locking mechanism connected to said auxiliary valves and responsive to actuation of one of said valves to hold the latter in open position until another auxiliary valve is actuated by said movable member.

20. In combination: a transmission having a driving shaft and a driven shaft, said transmission being shiftable to provide a plurality of speed ratios between said driving and driven shafts; a separate fluid pressure actuated transmission shifting mechanism for each of said speed ratios; a source of fluid under pressure; a variable pressure conduit means; and a distribution valve connected to said conduit means, said valve having a separate pressure responsive auxiliary valve connected to each of said shifting mechanisms and to said source of fluid under pressure, said auxiliary valves being normally closed and each of the latter being actuatable to open position wherein it delivers fluid under pressure from said source to the shifting mechanism connected to said auxiliary valve, said distribution valve also having a movable ported member which is successively registrable with said auxiliary valves in response to predetermined pressures in said conduit means to deliver fluid under pressure from said conduit means to the auxiliary valve with which the distribution member is in register to actuate said auxiliary valve.

21. In combination: a transmission having a driving shaft and a driven shaft, said transmission being shiftable to provide a plurality of speed ratios between said driving and driven shafts; a separate fluid pressure actuated transmission shifting mechanism for each of said speed ratios; a source of fluid under pressure; a variable pressure conduit means; a distribution valve connected to said conduit means, said valve having a separate pressure responsive auxiliary valve connected to each of said shifting mechanisms and to said source of fluid under pressure, said auxiliary valves being normally closed and each of the latter being actutable to open position wherein it delivers fluid under pressure from said source to the shifting mechanism connected to said auxiliary valve, said distribution valve having a movable ported distribution member which is successively registrable with said auxiliary valves in response to predetermined pressures in said conduit means to deliver fluid under pressure from said conduit means to the auxiliary valve with which the distribution member is in register to actuate said auxiliary valve; and releasable locking mechanism connected to said auxiliary valves and responsive to actuation of one of said valves to hold the latter in open position until another auxiliary valve is actuated.

22. In combination: a power transmitting mechanism having a rotary driving element adapted to be driven by a source of power and a rotary driven element; a transmission driven by said driven element and having a driven shaft, said transmission being shiftable to provide a plurality of speed ratios between said driven shaft and said driven element; a separate fluid pressure actuated transmission shifting mechanism for each of said speed ratios; a source of fluid under pressure; a pump driven by said driving element; a pump driven by said driven element; means for supplying fluid to the inlet of one of said pumps; conduit means connecting the outlet of said fluid-supplied pump to the inlet of the other of said pumps; and a distribution valve connected to said source of fluid under pressure and to said shifting mechanisms, said valve also being connected to said conduit means and being responsive to a predetermined pressure condition in said conduit means to deliver fluid under pressure from said source to a predetermined shifting mechanism.

23. In combination: a power transmitting mechanism having a rotary driving element adapted to be driven by a source of power and a rotary driven element; a transmission driven by said driven element and having a driven shaft, said transmission being shiftable to provide a plurality of speed ratios between said driven shaft and said driven element; a separate fluid pressure actuated transmission shifting mechanism for each of said speed ratios; a source of fluid under pressure; a pump driven by said driving element; a pump driven by said driven element; means for supplying fluid to the inlet of one of said pumps; conduit means connecting the outlet of said fluid-supplied pump to the inlet of the other of said pumps; and a distribution valve connected to said source of fluid under pressure and to said shifting mechanisms, said valve also being connected to said conduit means, and said valve normally being in a position to deliver fluid under pressure from said source to the shifting mechanism for effecting the highest of said speed ratios and being responsive to a predetermined pressure condition in said conduit means to deliver fluid under pressure from said source to a predetermined shifting mechanism.

24. In combination: a power transmitting mechanism having a rotary driving element adapted to be driven by a source of power and a rotary driven element; a transmission driven by said driven element and having a driven shaft, said transmission being shiftable to provide a plurality of speed ratios between said driven shaft and said driven element; a separate fluid pressure actuated transmission shifting mechanism for each of said speed ratios; a source of fluid under pressure; a positive displacement pump driven by said driving element; a positive displacement pump driven by said driven element; means for supplying hydraulic fluid to the inlet of one of said pumps; conduit means connecting the outlet of said fluid-supplied pump to the inlet of the other of said pumps; and a distribution valve connected to said source of fluid under pressure and to said shifting mechanisms, said valve also being connected to said conduit means and being responsive to a predetermined pressure condition in said conduit means to deliver fluid under pressure from said source to a predetermined shifting mechanism.

25. In combination: a power transmitting mechanism having a rotary driving element adapted to be driven by a source of power and a rotary driven element; a transmission driven by said driven element and having a driven shaft, said transmission being shiftable to provide a plurality of speed ratios between said driven shaft and said driven element; a separate fluid pressure actuated transmission shifting mechanism for each of said speed ratios; a source of fluid under pressure; a positive displacement pump driven by said driving element; a positive displacement pump driven by said driven element; means for supplying hydraulic fluid to the inlet of said driving element pump; conduit means connecting the outlet of said driving element pump to the inlet of said driven element pump and a distribution valve connected to said source of fluid under pressure and to said shifting mechanisms, said valve also being connected to said conduit means and being responsive to a predetermined pressure in said conduit means to deliver fluid under pressure from said source to a predetermined shifting mechanism.

26. In combination: a power transmitting mechanism having a rotary driving element adapted to be driven by a source of power and a rotary driven element; a transmission driven by said driven element and having a driven shaft, said transmission being shiftable to provide a plurality of speed ratios between said driven shaft and said driven element; a separate fluid pressure actuated transmission shifting mechanism for each of said speed ratios; a source of fluid under pressure; a pump driven by said driving element; a pump driven by said driven element; means for supplying fluid to the inlet of one of said pumps; conduit means connecting the outlet of said fluid-supplied pump to the inlet of the other of said pumps; and a distribution valve connected to said conduit means, said valve having a separate auxiliary valve connected to each of said shifting mechanisms and to said source of fluid under pressure, said auxiliary valves being normally closed and each of the latter being actuatable to open position wherein they deliver fluid under pressure from said source to the shifting mechanism connected to said auxiliary valve, said distribution valve also having a movable member for successively actuating said auxiliary valves in response to predetermined pressure conditions in said conduit means.

27. In combination: a power transmitting mechanism having a rotary driving element adapted to be driven by a source of power and a rotary driven element; a transmission driven by said driven element and having a driven shaft, said transmission being shiftable to provide a plurality of speed ratios between said driven shaft and said driven element; a separate fluid pressure actuated transmission shifting mechanism for each of said speed ratios; a source of fluid under pressure; a pump driven by said driving element; a pump driven by said driven element; means for supplying fluid to the inlet of one of said pumps; conduit means connecting the outlet of said fluid-supplied pump to the inlet of the other of said pumps; a distribution valve connected to said conduit means; said valve having a separate auxiliary valve connected to each of said shifting mechanisms and to said source of fluid under pressure, said auxiliary valves being normally closed and each of the latter being actuatable to open position wherein they deliver fluid under pressure from said source to the shifting mechanism connected to said auxiliary valve, said distribution valve also having a movable member for successively actuating said auxiliary valves in response to predetermined pressure conditions in said conduit means, and releasable locking mechanism connected to said auxiliary valves and responsive to actuation of one of said valves to hold the latter in open position until another auxiliary valve is actuated.

28. In combination: a power transmitting mechanism having a rotary driving element adapted to be driven by a source of power and a rotary driven element; a transmission driven by said driven element and having a driven shaft, said transmission being shiftable to provide a plurality of speed ratios between said driven element and said driven shaft; a separate fluid pressure actuated transmission shifting mechanism for each of said speed ratios; a source of fluid under pressure; a pump driven by said driving element; a pump driven by said driven element; means for supplying fluid to the inlet of one of said pumps; conduit means connecting the outlet of said fluid-supplied pump to the inlet of the other of said pumps; and a distribution valve connected to said conduit means, said valve having a separate auxiliary valve connected to each of said shifting mechanisms and to said source of fluid under pressure, said auxiliary valves being normally closed and each of the latter being actuatable to open position wherein they deliver fluid under pressure from said source to the shifting mechanism connected to said auxiliary valve, said distribution valve also having a movable member for successively actuating said auxiliary valves in response to predetermined pressure conditions in said conduit means, said movable member normally being in a position to actuate the auxiliary valve connected to the shifting mechanism providing the highest speed ratio of said transmission.

29. In combination: a power transmitting mechanism having a rotary driving element adapted to be driven by a source of power and a rotary driven element; a transmission driven by said driven element and having a driven shaft, said transmission being shiftable to provide a plurality of speed ratios between said driven shaft and said driven element; a separate fluid pressure actuated transmission shifting mechanism for each of said speed ratios; a source of fluid under pressure; a pump driven by said driving element; a pump driven by said driven element; means for supplying fluid to the inlet of one of said pumps; conduit means connecting the outlet of said fluid-supplied pump to the inlet of the other of said pumps; and a distribution valve connected to said conduit means, said valve having a separate auxiliary valve connected to each of said shifting mechanisms and to said source of fluid under pressure, said auxiliary valves being normally closed and each of the latter being actuatable to open position wherein they deliver fluid under pressure from said source to the shifting mechanism connected to said auxiliary valve, said distribution valve also having a movable ported member which is successively registrable with said auxiliary valves in response to predetermined pressure conditions in said conduit means to connect said conduit means with the auxiliary valve with which the movable member is in register and thereby cause actuation of said auxiliary valve.

30. In combination: a power transmitting mechanism having a rotary driving element adapted to be driven by a source of power and a rotary driven element; a transmission driven by said driven element and having a driven shaft, said transmission being shiftable to provide a plurality of speed ratios between said driven shaft and said driven element; a separate fluid pressure actuated transmission shifting mechanism for each of said speed ratios; a source of fluid under pressure; a pump driven by said driving element; a pump driven by said driven element; means for supplying fluid to the inlet of one of said pumps; conduit means connecting the outlet of said fluid-supplied pump to the inlet of the other of said pumps; a distribution valve connected to said conduit means, said valve having a separate auxiliary valve connected to each of said shifting mechanisms and to said source of fluid under pressure, said auxiliary valves being normally closed and each of the latter being actuatable to open position wherein they deliver fluid under pressure from said source to the shifting mechanism connected to said auxiliary valve, said distribution valve also having a movable ported member which is successively registrable with said auxiliary valves in response to predetermined pressure conditions in said conduit means to connect said conduit means with the auxiliary valve with which the movable member is in register and thereby cause actuation of said auxiliary valve, and releasable locking mechanism connected to said auxiliary valve and responsive to actuation of one of said valves to hold the latter in open position until another auxiliary valve is actuated.

31. In combination: a power transmitting mechanism having a rotary driving element adapted to be driven by a source of power and a rotary driven element; a variable speed transmission driven by said driven element; a driven shaft driven by said transmission; fluid pressure actuated shifting mechanism connected to said transmission for varying the speed of said driven shaft relative to that of said driven element, said shifting mechanism normally effecting the highest speed ratio between said driven element and said driven shaft; a pump driven by said driving element; a pump driven by said driven element; means for supplying fluid to the inlet of one of said pumps; and conduit means connecting the outlet of said fluid-supplied pump to the inlet of the other of said pumps and to said fluid actuated shifting mechanism, whereby rotation of the driving element at a predetermined speed relative to the driven element causes a predetermined fluid pressure condition in said conduit means in response to which said shifting mechanism effects a predetermined relationship between the speed of the driven shaft and that of the driven element.

32. In combination: a power transmitting mechanism having a rotary driving element adapted to be driven by a source of power, a rotary driven element, and hydraulically actuated mechanism for directly connecting said driving element to said driven element; a positive displacement pump driven by said driven element; a positive displacement pump of predetermined smaller size driven by said driving element; means for supplying hydraulic fluid to the inlet of one of said pumps; conduit means connecting the outlet of said fluid-supplied pump to the inlet of the other of said pumps and to said hydraulically actuated means, whereby rotation of the driven element at a predetermined speed relative to the driving element causes a predetermined hydraulic pressure condition in said conduit means in response to which the element connecting mechanism directly connects said driving and driven elements; and a normally open bleeder valve of restricted capacity in said conduit means.

33. In combination: a power transmitting mechanism having a rotary driving element adapted to be driven by a source of power and a rotary driven element; a transmission driven by said driven element and having a driven shaft, said transmission being shiftable to provide a plurality of speed ratios between said driven shaft and driven element; a separate fluid pressure actuated transmission shifting mechanism for each of said speed ratios; a first source of fluid; a second source of fluid under pressure; a distribution valve connected to said second source and to said shifting mechanisms and responsive to a predetermined fluid pressure condition in said valve to deliver fluid under pressure from said second source to a predetermined shifting mechanism, said valve normally being in a position to deliver fluid under pressure from said second source to the shifting mechanism for effecting the highest of said speed ratios; and pump means connected to said first source and to said distribution valve and driven by said driving and driven elements in a manner to create said predetermined pressure condition in said valve in response to relative rotation of said driving and driven elements.

34. In combination: a power transmitting mechanism having a rotary driving element adapted to be driven by a source of power, a rotary driven element, and mechanism responsive to a predetermined fluid pressure condition therein for directly connecting said driving element to said driven element; a pump driven by said driven element; a pump driven by said driving element; means for supplying fluid to the inlet of one of said pumps; conduit means connecting the outlet of said fluid-supplied pump to the inlet of the other of said pumps and to said fluid pressure actuated element connecting means, whereby rotation of the driven element at a predetermined speed relative to the driving element causes said predetermined fluid pressure condition in said conduit means in response to which the element connecting mechanism directly connects said driving and driven elements.

ALBERT P. SCHNEIDER.

References Cited in the file of this patent
UNITED STATES PATENTS

| Number | Name | Date |
|---|---|---|
| Re. 21,385 | Cotterman | Mar. 12, 1940 |
| Re. 22,967 | Nutt et al. | Jan. 27, 1948 |
| 2,198,891 | Thoma | Apr. 30, 1940 |
| 2,223,716 | Bojessen | Dec. 3, 1940 |
| 2,226,801 | Black | Dec. 31, 1940 |
| 2,302,714 | Pollard | Nov. 24, 1942 |
| 2,313,187 | Williamson | Mar. 9, 1943 |
| 2,343,955 | Cotterman | Mar. 14, 1944 |
| 2,373,453 | Bunken | Apr. 10, 1945 |
| 2,416,154 | Chilton | Feb. 18, 1947 |
| 2,449,608 | LeMay | Sept. 21, 1948 |
| 2,461,218 | Lapsley | Feb. 8, 1949 |
| 2,548,207 | Dunn | Apr. 10, 1951 |